US008385256B2

(12) United States Patent
Kumar et al.

(10) Patent No.: US 8,385,256 B2
(45) Date of Patent: Feb. 26, 2013

(54) METHOD AND SYSTEM FOR EFFICIENT SYNCHRONIZATION IN A WIRELESS COMMUNICATION SYSTEM

(75) Inventors: Praveen Kumar, Bangalore (IN); Viswanatha Rao Thumparthy, Bangalore (IN)

(73) Assignee: Sasken Communication Technologies Ltd, Bangalore (IN)

( * ) Notice: Subject to any disclaimer, the term of this patent is extended or adjusted under 35 U.S.C. 154(b) by 852 days.

(21) Appl. No.: 12/332,935

(22) Filed: Dec. 11, 2008

(65) Prior Publication Data

US 2009/0161653 A1    Jun. 25, 2009

(30) Foreign Application Priority Data

Dec. 19, 2007 (IN) .......................... 3037/CHE/2007

(51) Int. Cl.
*H04B 7/212* (2006.01)
(52) U.S. Cl. ........................ 370/324; 370/503
(58) Field of Classification Search .................. 370/252, 370/535, 394, 503; 455/12.1; 375/133; 714/751; 379/59

See application file for complete search history.

(56) References Cited

U.S. PATENT DOCUMENTS

| | | | | |
|---|---|---|---|---|
| 5,491,741 | A * | 2/1996 | Farwell et al. | 370/347 |
| 6,085,347 | A * | 7/2000 | Du | 714/751 |
| 6,754,234 | B1 * | 6/2004 | Wiesner et al. | 370/503 |
| 2001/0022806 | A1 * | 9/2001 | Adachi | 375/133 |
| 2004/0114598 | A1 * | 6/2004 | Veerepalli et al. | 370/394 |
| 2004/0214522 | A1 * | 10/2004 | Santhoff et al. | 455/12.1 |
| 2006/0083271 | A1 * | 4/2006 | Lim et al. | 370/535 |
| 2011/0128869 | A1 * | 6/2011 | Coleri Ergen et al. | 370/252 |

* cited by examiner

*Primary Examiner* — Andrew Lai
*Assistant Examiner* — Syed M Bokhari

(57) ABSTRACT

Embodiments herein provide a method and system for synchronization in a Wireless Communication Network using a new frame, Synchronization Frame (SF), and a configurable length of the same that is transmitted from a Network Controller (NC) to the Network Elements (NEs) in the network. The periodicity of the SF could be changed, to align with the data exchange periodicity, while still keeping synchronization. The length of the SF is made configurable to achieve this effect. It is directly proportional to the period, with which it needs to be transmitted, i.e., a larger delay between two SFs is achievable through the use of a larger SF frame size. This method provides a mechanism in which synchronization between the NC and NEs is achieved by listening to only a part of the SF, which is constant in size. This method also provides tolerance to failure by using acknowledgement schemes.

17 Claims, 6 Drawing Sheets

METHOD AND SYSTEM FOR EFFICIENT SYNCHRONIZATION IN A WIRELESS COMMUNICATION SYSTEM

RELATED APPLICATIONS

The present application is based on, and claims priority from, Indian Application Number 3037/CHE/2007, filed Dec. 19, 2007, the disclosure of which is hereby incorporated by reference herein in its entirety.

FIELD OF INVENTION

The embodiments herein generally relate to wireless communications systems, and, more particularly, to synchronization in wireless communications systems.

BACKGROUND AND PRIOR ART

Many applications have very low data exchange rate, as low as once in 30 minutes. In such cases synchronization process according to existing technologies happens at a much faster rate, which is an expense on both battery power and spectral usage. As a result, in these cases there is a requirement that the terminal equipment matches its synchronization frequency with that of its data exchange. This will lead to the terminal equipment sleeping for longer durations and the durability of the battery is extended. Also, there is a need for the channel being used only as frequently as is required, for example, for data exchanges, as this increases the availability of spectrum for use by others. This helps in accommodating more number of networks in the same frequency band. These are highly desirable features for many wireless terminals and networks.

Two forms of synchronization are typical in a wireless communication system. Frequency synchronization refers to the adjusting of the receiver's transceiver chip's frequency generation system to match the sender's frequency generation system. This is required for correct reception of the signal at the RF level. Time synchronization refers to the establishment of a common reference for time amongst the entities of the network. Typically, time synchronization information is transmitted by a network coordinator (such as a base station) and other entities get synchronized with this information. Time synchronization requirements could be absolute or relative. In absolute time synchronization real world time is used for synchronization. The source for such time could be Global Positioning Systems (GPS). The network coordinator could have access to the GPS and distribute this time to the other entities of the network. In relative time synchronization it is sufficient to be able to time the events according to a network-wide reference, not an absolute time. The network coordinator could provide the reference. In either case, the network entities get synchronized with the time distributed by the network coordinator with a precision subject to the propagation delays. They continue to update this time locally and use it for timestamping their events. As the clocks of the entities keep drifting relatively, the synchronization task is repeated frequently. The time deviation of one clock relative to another clock, known as clock drift, occurs due to the physical nature of the quartz crystals used to implement the clocks.

In accordance with current network synchronization techniques, an element in the wireless network (NE) spends an appreciable amount of energy for time synchronization. The energy spent for synchronization is a big overhead for networks with low data exchange rate. An example of an application with low data exchange rate is human body monitoring, where specifics of various physical and biological parameters of the body can be transferred at intervals of 5 to 30 minutes. In such applications, in accordance with the current synchronization techniques, the NEs may be required to wake up more frequently only for time synchronization rather than for data exchange.

In accordance with IEEE 802.15.4 standard, an exemplary standard of a wireless communication network, viz., Wireless Sensor Network (WSN), time synchronization occurs through the beacon frames. All NEs time their actions with reference to the beacon frame. The beacons are transmitted periodically to ensure continued time synchronization. The NEs need to receive the beacon frames to keep in synchronization. The beacons also contain information for the NEs to time their receptions and transmissions. Every beacon frame, like all other frames, has a Preamble Data (PD) sequence of 32 bits present at the beginning. When the 2.4 GHz band is used the data rate is 250 Kbps. Thus the PD is transmitted for 128 microseconds ($\mu$s). NEs use the PD sequence to tune in to receive the rest of the frame, i.e., they have a window of 128 $\mu$s for tuning in. This determines the upper bound for the clock drift, at any NE, between two beacon transmissions by the NC. If the relative clock drift between the NC and an NE exceeds 128 $\mu$s between two beacon transmissions, then time synchronization is lost between the NC and the particular NE. For a clock with a drift of 40 parts per million (ppm), the NEs can drift by 128 $\mu$s in just 3.2 seconds. This will require the NC to send a beacon frame, to the NEs after every three seconds, keeping 0.2 seconds margin as a buffer. Consequently, the duty cycle (the beacon frame size transmitted per second) for time synchronization even for the shortest beacon frame size (544 $\mu$s) will be 181.333 $\mu$s per second. Compared to this, the data communication requirement taken at 100 bytes per 5 minutes would require the NE to be active only for 32 $\mu$s per second, at a data rate of 250 Kbps. Thus, the duty cycle for synchronization becomes higher than that of data exchange amongst the devices. In such a case, the NEs will have to become active more frequently for time synchronization than for data exchange. For a battery powered system where replacement of battery is impractical and, therefore, a significant operational overhead, frequent synchronization becomes a significant burden on the system

SUMMARY OF INVENTION

In view of the foregoing, an embodiment herein provides a method for synchronization in a Wireless Communication Network using a configurable frame for synchronization, comprising a network controller (NC) and a plurality of network elements (NEs), the method comprising steps of the NC creating a primary configurable synchronization frame; the NC transmitting the primary synchronization frame to the NEs using the physical layer; the NEs receiving the primary synchronization frame; the NEs transmitting an acknowledgement to the NC, on the NEs completing synchronization with the NC; the NC receiving the acknowledgements from the NEs; the NC checking if a first criterion has been satisfied; and the NC transmitting secondary synchronization frames till a first criterion is satisfied. The synchronization frame is configured by the NC based on factors comprising of maximum allowable clock drift rate value of the NEs and the maximum data exchange value associated with the NEs. The length of the synchronization frame is configured to match periodicity of transmission of the synchronization frame with the maximum data exchange rate of the NEs. The synchronization frame comprises of synchronization blocks, each synchronization block comprising of a predetermined training sequence; a sequence confirming identity of the NC to the Wireless Communication Network; and a sequence comprising information about position of the Synchronization block in the synchronization frame. The length of the synchronization frame can be configured by varying the number of synchronization blocks present in the synchronization frame. The NEs perform synchronization using at least one full synchronization block of the synchronization frame. The first criterion could be the NC receiving acknowledgements from all the NEs or a pre-determined number of iterations, and can be configured by system administrator of the wireless communication network. The secondary synchronization frames comprise of a reduced length as compared to length of the primary synchronization frame; and an increased frequency of transmission as compared to frequency of the primary synchronization frame.

Embodiments herein also disclose a Network Controller (NC), the NC connected to a plurality of Network Elements (NEs) in a Wireless Communication Network, the NC adapted to create a primary configurable synchronization frame; transmit the primary synchronization frame to the NEs using the physical layer; receive acknowledgements from the NEs; check if a first criterion has been satisfied; and transmit secondary synchronization frames till the first criterion is satisfied. The synchronization frame is configured based on factors comprising of maximum allowable clock drift rate value of the NEs; and the maximum data exchange value associated with the NEs. The NC configures the length of the synchronization frame to match periodicity of transfer of the synchronization frame with the maximum data exchange rate of the NEs. The NC varies length of the synchronization frame by varying the number of synchronization blocks present in the synchronization frame.

Also, disclosed herein is a Network Element (NE) in a Wireless Communication Network, the network comprising of NEs and a Network Controller (NC), the NE adapted to receive a synchronization frame from the NC; perform synchronization with the NC using the synchronization frame and transmit an acknowledgement to the NC, on the NE completing synchronization with the NC. The NEs commence synchronization by setting a synchronization window size equal to the synchronization frame size, but complete synchronization by using at least one full synchronization block of the synchronization frame. After synchronization, the NEs could sleep till their transmission and receptions allocations are communicated, at a pre-determined interval after the synchronization frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following description with reference to the drawings, in which.

DESCRIPTION OF EMBODIMENTS

Figure 1:
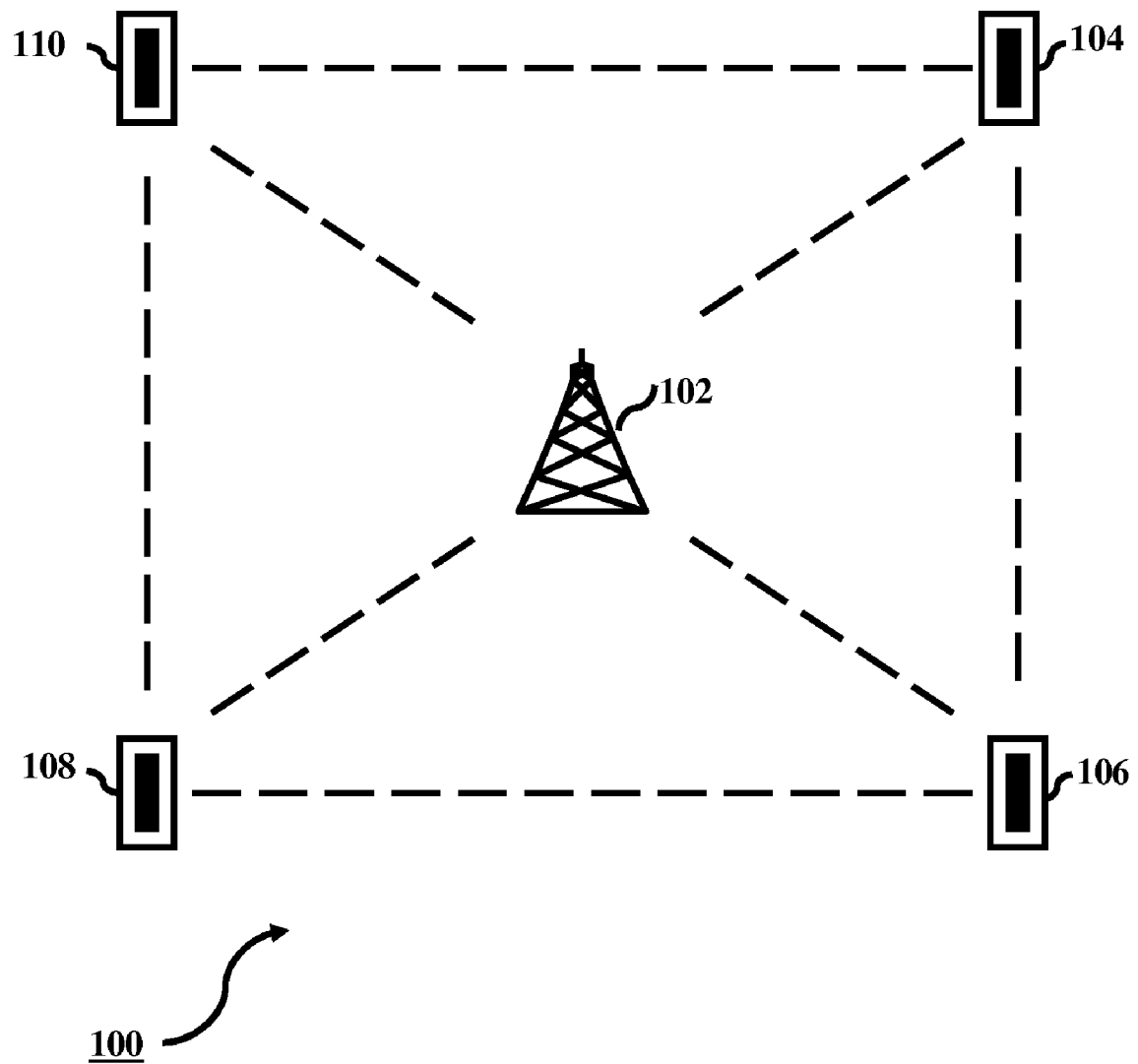
FIG. 1 illustrates an exemplary Wireless Communication Network, in accordance with various embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for synchronization in a wireless communication network. Referring now to the drawings, and more particularly to FIGS. 1 through 6, where similar reference characters denote corresponding features consistently throughout the figures, there are shown preferred embodiments.

Various embodiments disclosed herein provide a method and system for synchronization in a Wireless Communication Network. Embodiments herein provide a new frame, Synchronization Frame (SF), and a configurable format of the same that is transmitted from a Network Controller (NC) to the Network Elements (NEs) in the network. The periodicity of the SF could be changed to match with the data exchange periodicity, while still keeping synchronization, even with the clocks of the NE drifting. The length of the SF is made configurable to achieve this effect. It is directly proportional to the period, with which it needs to be transmitted, i.e., a larger delay between two SFs is achievable through the use of a larger SF frame size. Even though different frame sizes may be used to match different data exchange rates, this method provides a mechanism in which synchronization between the NC and NEs is achieved by listening to only a part of the SF, which is constant in size.

FIG. 1 illustrates an exemplary network 100, in accordance with various embodiments. The network 100 includes a network controller (NC) 102 and network elements (NEs) 104, 106, 108 and 110. For one embodiment, the NC 102 coordinates exchange of data between the NEs 104, 106, 108 and 110 or between the NEs and itself. Further, the NEs 104, 106, 108 and 110 may be equipped with transducers, sensors and transceivers for obtaining data from a source. On obtaining the data, the corresponding NE can transmit the necessary data to other NEs and/or the NC. The NC and each NE may also include a power source for driving the various electronic circuitries used in the NC and the NEs. The power source can be, for example, a battery.

Figure 2:
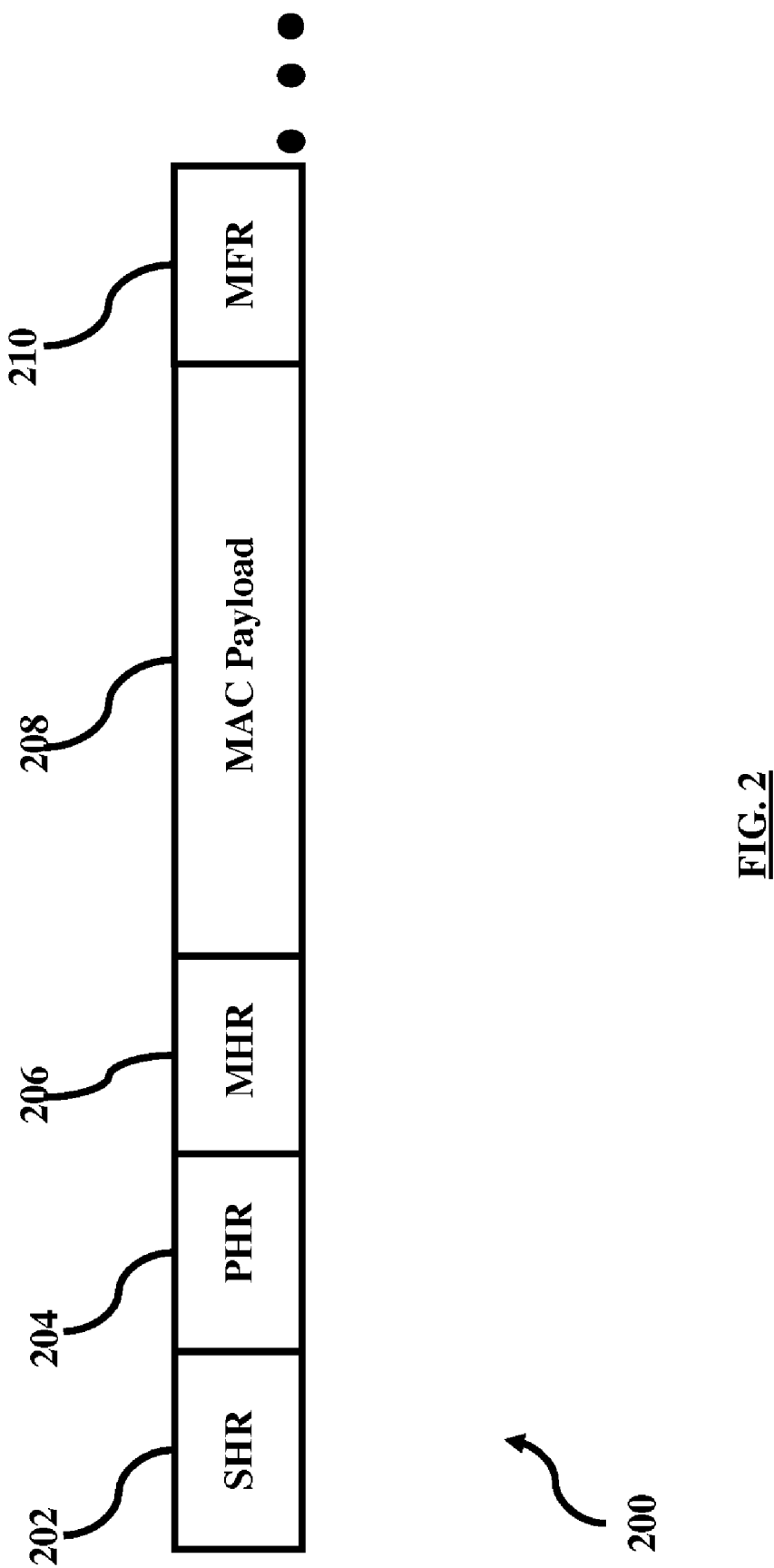
FIG. 2 illustrates an exemplary frame format for wireless communication, in accordance with various embodiments disclosed herein.

FIG. 2 illustrates an exemplary frame format for wireless communication, in accordance with various embodiments disclosed herein. The exemplary frame format can, for example, starts with a Synchronization header (SHR) 202 followed by a Physical layer header (PHR) 204 and a Medium Access Control (MAC) sublayer header (MHR) 206, which is followed by data. The data can be referred to as MAC Payload 208. Further, the MAC Payload 208 can be followed by a MAC sublayer Footer (MFR) 210. For one embodiment, the SHR can include a preamble and a start-of-frame (SOF) delimiter. The reception of the preamble enables chip and symbol synchronization and the reception of the SOF indicates end of SHR and start of packet data at a receiving device, for example, the NE 104. Preamble is a well defined value and of fixed size, so that the receiver is able to adjust its frequency generation system to match the transmitter's system (NC). SOF contains well defined values, which help the receiver in synchronizing its byte boundaries.

Figure 3:
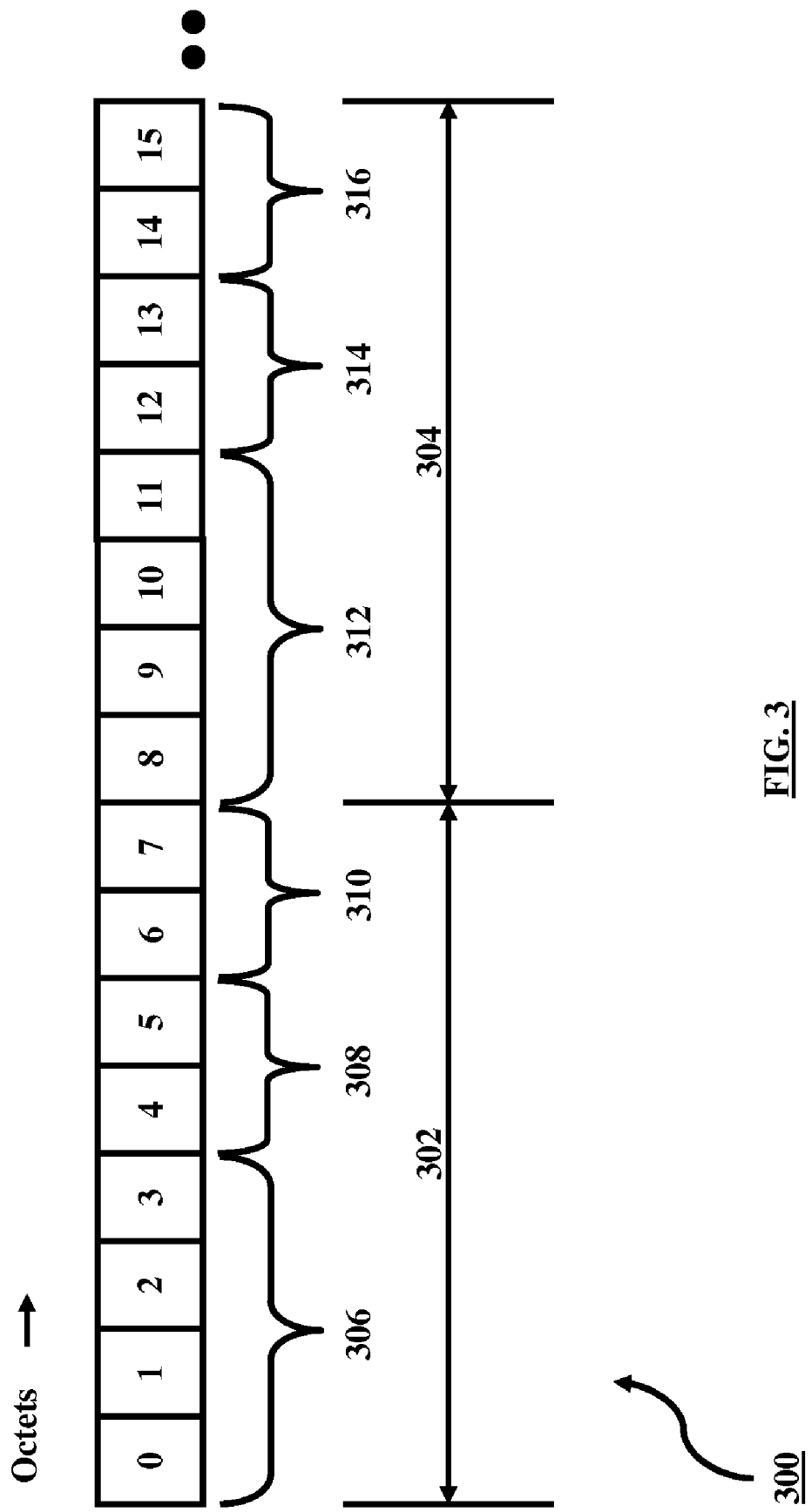
FIG. 3 illustrates an exemplary format of a Synchronization Frame (SF), in accordance with various embodiments disclosed herein.

FIG. 3 illustrates an exemplary format of a synchronization frame (SF) 300, in accordance with various embodiments disclosed herein. The SF 300 can be transmitted by the NC 102 to the network 100, to facilitate time synchronization between the NC 102 and NEs, for example, at the NE 104. The SF 300 includes one or more synchronization blocks (SBs), for example SBs 302 and 304, and other trailing SBs. For one embodiment, the length of the SF 300 is dependent on the number of SBs in the SF 300. The SF 300 can be configured to a certain length by manipulating the number of SBs in the SF 300. The length of the SF 300 will be directly proportional to the amount of time an NE may sleep, without listening to any communication, and still be able to synchronize with the NC when the next SF is transmitted. As an illustration, in IEEE 802.15.4, the beacon transmissions need to be sent every 3.2 seconds. Beyond this period, the NE may not be able to synchronize with the NC due to the drift of the local clock with respect to the reference clock in the NC. With the synchronization frame transmissions this period is increased. The SFs would be transmitted periodically to keep continued synchronization, typically followed by a beacon. The periodicity of SF transmission (and, therefore, the length of SF) should, ideally, match with the highest frequency of data exchange between the various entities. The length of the SF 300 may be determined at any of the layers of the OSI model. However, the SF 300 is transmitted from the physical layer (PHY).

For one embodiment, the SB 302 can include eight octets (bytes) divided into a Preamble Data (PD) block 306, a Network Controller Address (NCA) block 308 and a Count and Check (CC) block 310. The SB 304 can be similar to the SB 302 and can be divided into a PD block 312, an NCA block 314 and a CC block 316. For the sake of clarity of description, an SB has been explained in accordance with the SB 302. The structure of the SBs 302 and 304 and other trailing SBs of the SF 300 are similar. However, the data carried by different blocks of the SBs 302 and 304 and other trailing SBs of the SF 300 can be different. The PD block 306 can be constituted of four octets and is a predetermined training sequence such as binary zeroes. This is used for frequency synchronization of the NE. The NCA block 308 can be constituted of two octets and confirms to the network 100 that the SF 300 is transmitted from the NC 102. The CC block 310 can be constituted of two octets and can be used to contain information about the number of the current SB 302 in the SF 300. Further, the CC block 310 also ensures that the SB read by the NE 104 is error free. The CC block 310 includes further information useful for reducing synchronization overhead of the NE 104. This aspect of the CC block 310 has been explained in detail in accordance with FIG. 4.

Figure 4:
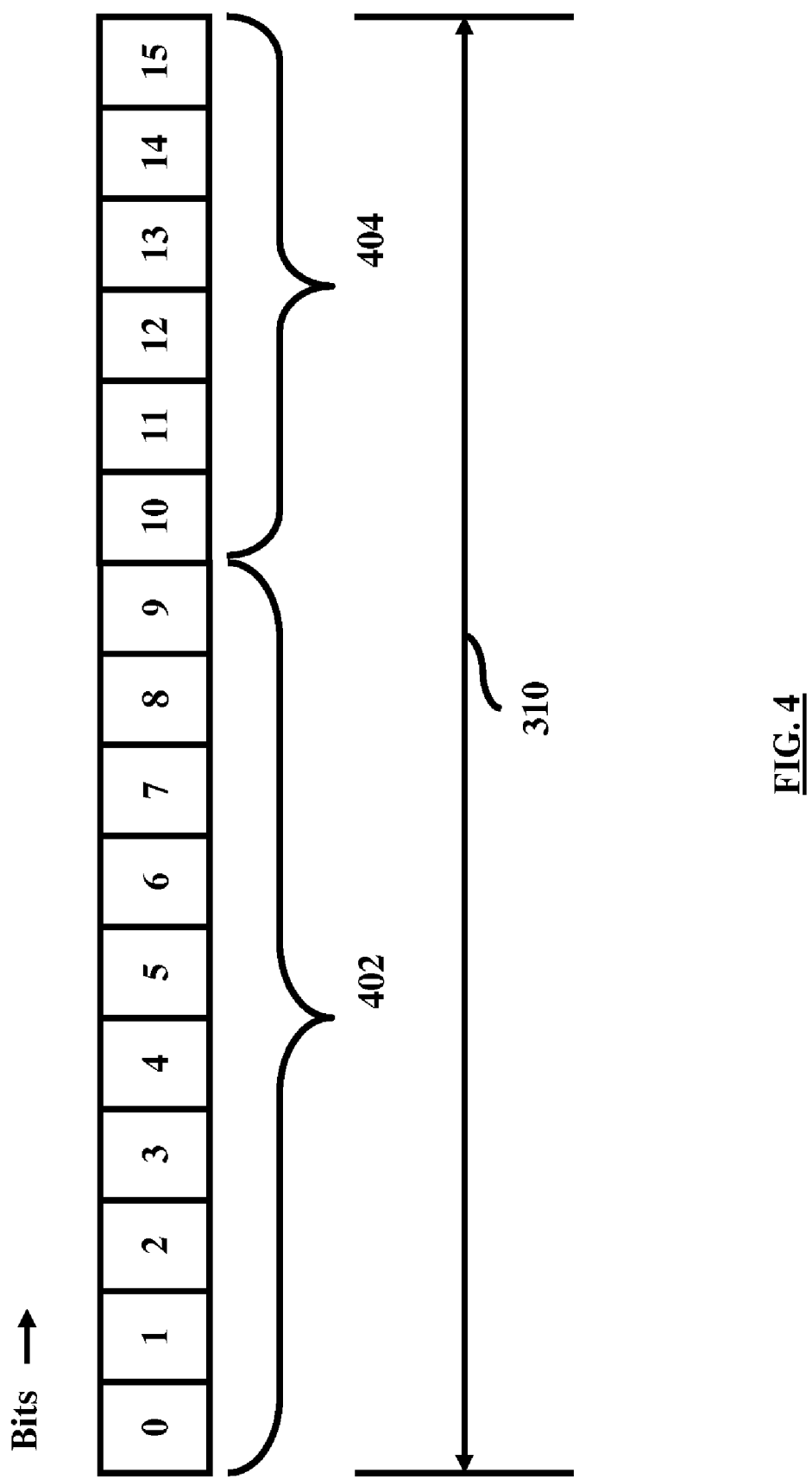
FIG. 4 illustrates an exemplary format of Count and Check (CC) frame, in accordance with various embodiments disclosed herein.

FIG. 4 illustrates an exemplary format of the CC block 310, in accordance with various embodiments disclosed herein. The CC block 310 can include two parts, namely, a Count (CNT) 402 and a Cyclic Redundancy Check (CRC) 404. The CNT 402 notifies the number of the current SB in an SF, such as, the number of the SB 302 in the SF 300. For example, if an SF contains 512 SBs, and the current SB received at a node of the network is the $499^{th}$ SB of the SF, then, for one embodiment, the CNT may include binary equivalent of 498. (The total number of SBs being transmitted by the NC is communicated at the time of network association typically.) For another embodiment, the CNT may include the number of SBs expected to be received from the controller, after the reception of the current SB. For example, if an SF contains 512 SBs, and the current SB received at a node of the network is the $499^{th}$ SB of the SF, then the CNT may include binary equivalent of 13 (512−499). The CRC 404 allows the NE to validate the integrity of the SB data, not including itself, by computing and comparing the cyclic redundancy code at the receiving end. The SBs can be used by the NEs for time synchronization. Further, for one embodiment, an NE, for example, the NE 110 is required to listen to only two SBs of the SF 300 in order to synchronize its time. In accordance with the embodiments herein, time synchronization by listening to only two SBs can be explained by using the following example. The SF 300 can include 512 SBs. For the sake of clarity of description, the example has been explained in accordance with the SBs 302 and 304. When the NE 110 receives the SB 302, the NE 110 starts processing the SB to obtain relevant information. The PD field is used for bit synchronization. The NCA field, CNT field and the CRC field are used to validate that an SB has been received. If the NE begins synchronization in the middle of an SB, it may not be able to achieve the above tasks. In such a case, the NE will achieve the above tasks by receiving the next full SB. The NE 110 will have prior knowledge of the duration of each SB. For example, in accordance with IEEE 802.15.4 O-QPSK modulation at 2.4 GHz of 8 octets, the NE 110 knows that the duration of each SB will be 256 µs. On receiving a full SB, the NE is able to determine the number of SBs following the current SB. Thus, it is able to compute the time for the end of the SF. The NE will sleep for this duration and wake up to reset its clock. Since all NEs will perform this task at the same time, they will achieve relative time synchronization. They could awake at this time or a configured interval after this time, to read a communication, which could be a beacon, from the NC that determines their transmission and reception allocations. Further, the NE 110 can also use the time interval of reception of a full SB for correcting any clock drift errors in its local clock. Each SB of an SF is of fixed time duration. Consequently, the number of SBs included in the SF 300 when multiplied by the duration (256 µs) of each SB results in the duration of the SF 300. For example, in one scenario, the SF 300 can include 512 SBs, similar in structure to the SB 302. The duration of the SF 300 can be calculated as 512×256 µs=131072 µs. When the SF 300 of this duration is transmitted, then NEs may sleep for a duration till their clocks could, potentially, drift beyond this value. For a clock drift rate value of 40 µs per second or 40 parts per million (ppm) this amount of drift happens in 131072/40=3276.8 seconds, which is equal to 54.6 minutes. When an NE wakes up with this periodicity, it will be in time to receive the SF, despite the clock drift. For continued synchronization the SF 300 can be transmitted with the above periodicity and the NE attempts synchronization with the same periodicity. By using the above mentioned calculations, the number of SBs in an SF can be configured for any desired periodicity. Ideally, the periodicity of the SF 300 transfer should be matched with that of the highest data exchange rate in the Wireless Communication Network 100. The duration of the SF 300 can be either increased or decreased to support the synchronization periodicity ranging from few seconds to a few hours.

Figure 5:
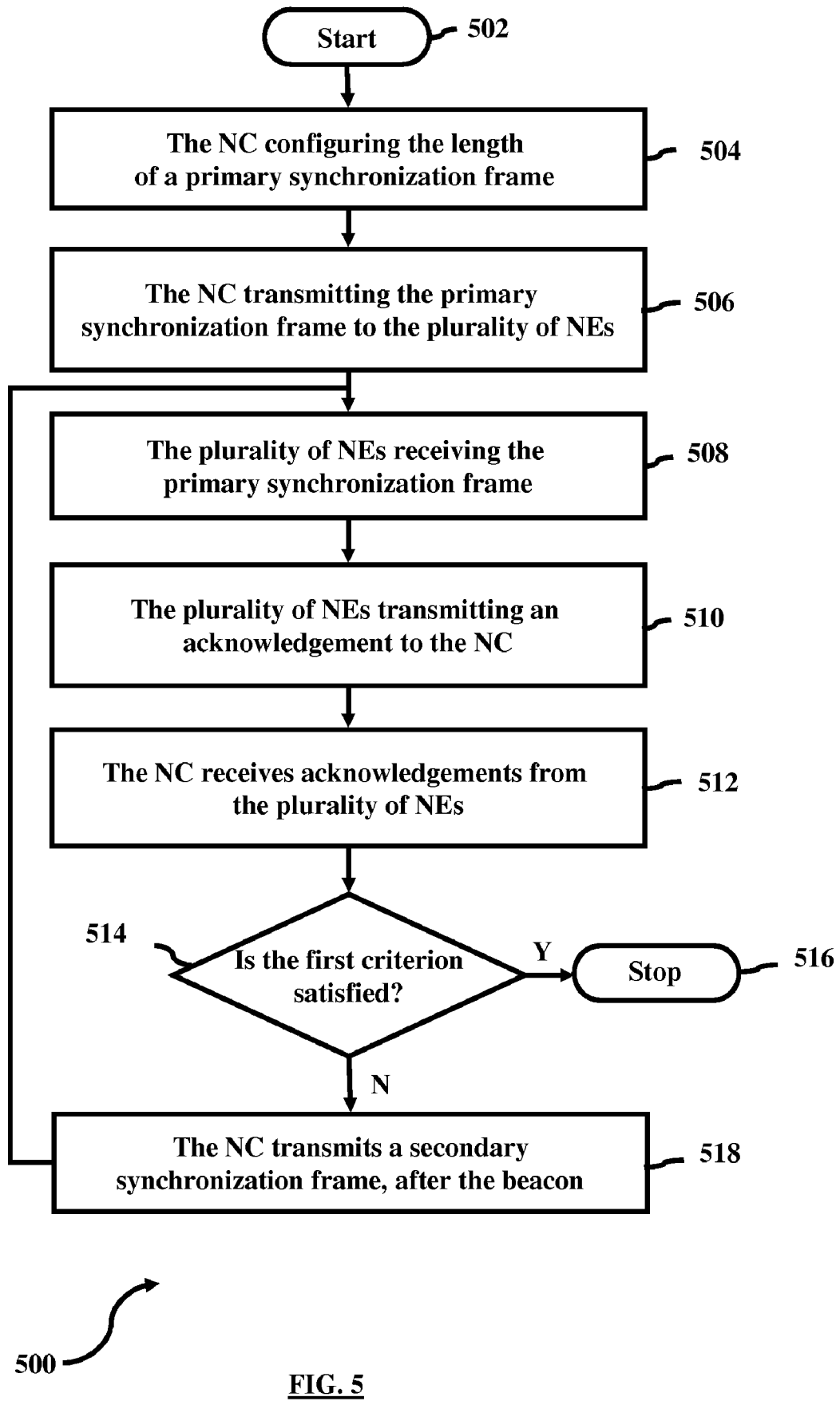
FIG. 5 illustrates a flow diagram of a method for synchronization in a Wireless Communication Network, in accordance with various embodiments disclosed herein.

In accordance with one embodiment disclosed herein, the length of the CNT block 402 can be 10 bits. For one embodiment, these 10 bits can include the binary equivalent of the number of trailing SBs in an SF after the reception of an SB. Consequently, the maximum number of SBs that can be included in an SF is 1024. For 1024 SBs in an SF the duration of the SF would be 1024×256 µs=262.144 milliseconds. Consequently, the periodicity of SF 300 transmission for 1024 SBs and clock drift of 40 ppm can be (1024×256 µs)/40=6553.6 seconds, which is equal to 109.2 minutes. Similarly, depending on the synchronization requirement of a network, any other periodicity of an SF transmission can be configured based on the direct proportion with the number of SBs in the SF. For example, as the periodicity, for 1024 SBs can be calculated as 109.2 minutes, similarly, for 256 blocks, the periodicity of an SF transmission can be calculated as (1024×256 µs)/40=27.3 minutes. FIG. 5 illustrates a flow diagram 500 of a method for synchronization in the wireless communication network 100. The method for synchronization in the network is initiated at step 502. At step 504, the length of a primary SF 300 is configured at the NC 102. For one embodiment, the length of the primary SF 300 can be configured based on the maximum allowable clock drift rate value of the NEs and a frequency of data exchange value associated with an NE, for example, the NE 110, which has the highest data exchange rate. At step 506, the primary SF 300 is transmitted from the NC 102 to the plurality of NEs 104, 106, 108 and 110. At step 508 the primary synchronization frame is received by the plurality of NEs 104, 106, 108 and 110. At step 510 an acknowledgement of the event is transmitted by the plurality of NEs 104, 106, 108 and 110. At step 512 the acknowledgements from the pending NEs is received at the NC 102, wherein the pending NEs are the ones from which an acknowledgement has not been received. At step 514 the NC 102 verifies the validity of a first criterion. For one embodiment the first criterion can include reception of the acknowledgments from all the NEs. In another embodiment, the first criterion can be a pre-configured number of iterations. It should be understood and appreciated that there can be several different types of criteria that can be a part of the first criterion and that first criterion can be configured by a system administrator. If the first criterion has been met, the method terminates at step 516. However, if the first criterion has not been met, then the method proceeds to step 518. At step 518 the NC 102 retransmits a shorter secondary synchronization frame which is determined at the time of configuration of the Wireless Communication Network 100. The secondary SF has a reduced length as compared to length of the primary SF 300 and an increased frequency of transmission as compared to frequency of the primary SF 300. The duration of the secondary SF transmissions is specified at the time of network configuration. The secondary SFs would be transmitted once for every NE that has not acknowledged the primary SF, at a pre-determined time interval after the end of the primary SF less the likely clock drift being experienced by the NE. An estimate of the likely clock drift of the NE is obtained from the immediate last acknowledgement from the NE. Whenever the NE receives the primary SF and synchronizes with the NC, it computes the clock drift with respect to the NC. The clock drift is computed as the difference in clocks between the NC and NE. This value is communicated in the acknowledgement. For the secondary SF transmissions, the CNT 402 is assigned as the number of SBs after the end of the primary SF transmission that would be required to be transmitted to align with this SB. It should be noted that these many SBs would not be transmitted by the NC. This is a virtual number provided for synchronization with respect to the primary SF transmission that is past. The NE will attempt synchronization with the shorter secondary SF intended for it. With this scheme, an NE will not have to wait till the next primary SF for time synchronization. The method then reverts to step 508 after this step. The various actions in method 500 may be performed in the order presented, in a different order or simultaneously, where possible. Further, in some embodiments, some actions listed in FIG. 5 may be omitted.

For one embodiment, on receiving the SF 300 from the NC 102 and completing the synchronization with the NC 102, the NEs transmit an acknowledgement (ACK) frame to the NC 102. The acknowledgements are required, as the NEs may fail to synchronize with the NC 102, as the Wireless Communication Network 100 may be subject to interference from another communication system, which could result in interruption in communication and the NEs may not receive the SF 300. If a NE has failed to synchronize with the NC 102 with the help of the secondary SFs, then it waits till the next primary SF transmission. At this time, the NE will increase its synchronization window to double the length of the primary SF, as the clock drift value would have doubled by this time. Thus, the secondary SFs allow the NEs to synchronize earlier than the transmission of the next primary SF and using a lower size of synchronization windows.

Figure 6:
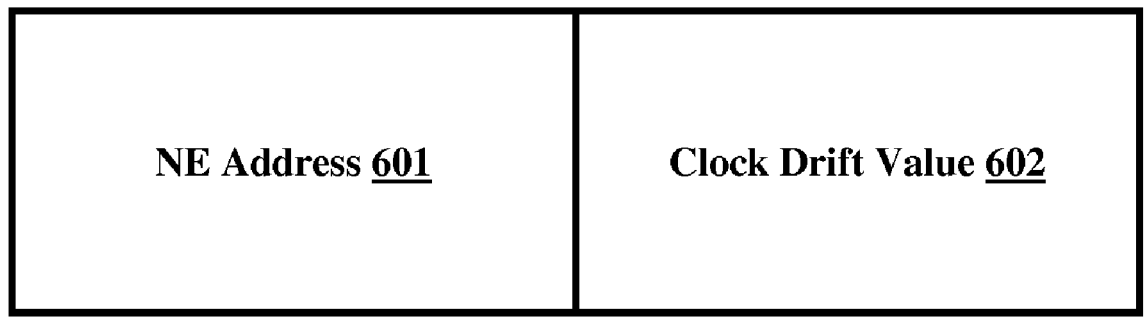
FIG. 6 depicts an acknowledgement frame, according to embodiments disclosed herein.
Figure 6:

FIG. 6 depicts an acknowledgement frame, according to embodiments disclosed herein. On receiving the SF 300 from the NC 102 and completing the synchronization with the NC 102, the NEs transmit an acknowledgement (ACK) frame 600 to the NC 102. The acknowledgement frame 600 comprises fields of NE Address (NEA) 601 and Clock Drift Value (CDV) 602. The NEA 601 confirms the identity of the NE to the NC 102. The CDV 602 contains the clock drift value of the NE and is computed as the difference in clocks between the NC 102 and the NE, whenever the NE receives the primary synchronization frame and synchronizes with the NC 102. The NC 102 after receiving the acknowledgement frame 600 confirms the identity of the NE by using NEA 601 and reads the estimate of the likely clock drift value from CDV 602. If the NC 102 does not receive the acknowledgement frame 600 from the NE, the NC uses the previous acknowledgement frame 600 received from the NE to compute the time interval at which the secondary SF has to be transmitted. The NC 102 transmits the secondary SF for that NE at a time interval after the end of the primary SF less the likely clock drift value experienced by the NE, obtained from CDV 602 of the acknowledgement frame 600 which has been received from the NE.

Embodiments disclosed herein enable a reduction in the synchronization overhead by requiring the NE to listen only to a partial portion of the SFs instead of the full SFs, to complete synchronization with the NC.

A Wireless Sensor Network (WSN) could be taken as an example of a wireless communication network. WSN is a network of wirelessly connected devices that use sensors to monitor physical or environmental conditions. Such physical or environmental conditions include, but are not limited to, temperature, sound, vibration, pressure and motion. Main applications of the WSN are in the field of battlefield surveillance, environment and habitat monitoring, healthcare applications, home automation and traffic control. Typically, a WSN could include a NC, and wirelessly connected nodes, referred to as NEs. Typically, the NEs and NC are battery powered. Also, relative time synchronization is sufficient for many applications. After synchronization, the NEs and the NC could exchange data that is timestamped by using their local time. Timestamping of data helps in collating data obtained from two or more nodes to derive a higher level result. For example, timestamped measurements obtained from different nodes can be used to derive velocity of an object. The NEs may also use the time synchronization information to go into sleep mode till data relevant to them is expected on the wireless medium. This time is communicated to them a priori. Consequently, time synchronization becomes an indispensable component of the WSN communication method.

Typically, the NEs are small devices which have size restrictions, with tiny batteries. They are anticipated to be deployed in large numbers for a particular application. Many times they may also be deployed in inhospitable or inaccessible environments. Thus, there is a requirement that the devices need little or no maintenance. One of the dimensions of this requirement is the durability of the battery. As a result, the NEs are required to be energy efficient. An example of an application with low data exchange rate is human body monitoring, where specifics of various physical and biological parameters of the body can be transferred at intervals of 5 to 30 minutes.

As an illustration, in a WSN, a Synchronization Frame (SF), and a configurable length of the same is provided that is transmitted from a Network Controller (NC), before a beacon to the Network Elements (NEs). The periodicity of the SF could be changed, along with the beacon following it to match with the data exchange periodicity, while still keeping synchronization, even with the NE clocks drifting. The length of the SF is made configurable to achieve this effect. It is directly proportional to the period, with which it needs to be transmitted, i.e., a larger delay between two SFs is achievable through the use of a larger SF frame size. Even though different frame sizes may be used to match different data exchange rates, this method provides a mechanism in which synchronization between the NC and NEs is achieved by listening to only a part of the SF, which is constant in size. This reduces the synchronization overhead.

The embodiments disclosed herein have been illustrated in the context of a Wireless Sensor Network (WSN). However, it will be apparent to those ordinarily skilled in the art the applicability of the invention to many other wireless communication systems.

The embodiments disclosed herein can be implemented through at least one software program running on at least one hardware device and performing network management functions to control the network elements. The network elements shown in the figures include blocks which can be at least one of a hardware device, a software module or a combination of hardware device and software module.

It is understood that the scope of the protection is extended to such a program and in addition to a computer readable means having a message therein, such computer readable storage means contain program code means for implementation of one or more steps of the method, when the program runs on any suitable programmable device. The method is implemented in a preferred embodiment through or together with a software program written in e.g. Very high speed integrated circuit Hardware Description Language (VHDL) or C, C++, Java, or using another programming language, or implemented by one or more VHDL, C, C++, or Java processes or routines, or several software modules being executed on at least one hardware device. The hardware device can be any kind of device which can be programmed including e.g. any kind of computer like a server or a personal computer, an FPGA, a processor, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the embodiments herein may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for synchronization in a Wireless Communication Network, comprising a network controller (NC) and a plurality of network elements (NEs), said method comprising: said NC creating a primary configurable synchronization frame; said NC transmitting said primary synchronization frame to said plurality of NEs; said plurality of NEs receiving said primary synchronization frame; said plurality of NEs transmitting an acknowledgement to said NC, on said NEs completing synchronization with said NC; said NC receiving said acknowledgements from said plurality of NEs; said NC checking if a first criterion has been satisfied; and said NC transmitting secondary synchronization frames till said first criterion is satisfied, wherein said secondary synchronization frame is of a reduced length as compared to length of said primary synchronization frame and has an increased frequency of transmission as compared to frequency of transmission of said primary synchronization frame.

2. The method as claimed in claim 1, wherein said primary synchronization frame is configured by said NC based on factors comprising of
  maximum allowable clock drift rate value of said NEs; and
  data exchange value associated with a NE from said plurality of NEs, wherein said NE has the highest data exchange value.

3. The method as claimed in claim 1, wherein length of said primary synchronization frame is configured to match periodicity of transmission of said primary synchronization frame with data exchange rate of said plurality of NEs.

4. The method as claimed in claim 1, wherein said synchronization frames comprise of a plurality of synchronization blocks, each of said plurality of synchronization blocks comprising of
  a predetermined training sequence;
  a sequence confirming identity of said NC to said Wireless Communication Network; and
  a sequence comprising information about position of said Synchronization block in said synchronization frames.

5. The method as claimed in claim 1, wherein length of said synchronization frames are configured by varying the number of said synchronization blocks present in said synchronization frame.

6. The method as claimed in claim 1, wherein said synchronization frames are transmitted by physical layer.

7. The method as claimed in claim 1, wherein said plurality of NEs performs synchronization using at least one full synchronization block of said synchronization frames.

8. The method as claimed in claim 1, wherein said first criterion is NC receiving acknowledgements from all of said plurality of NEs, said acknowledgement comprising of
identity of NE transmitting said acknowledgement frame; and
clock drift value of said NE.

9. The method as claimed in claim 1, wherein said first criterion is configured by system administrator of said wireless communication network.

10. The method as claimed in claim 1, wherein said secondary synchronization frame comprises of
a reduced length as compared to length of said primary synchronization frame; and
an increased frequency of transmission as compared to frequency of said primary synchronization frame.

11. A Network Controller (NC), said NC connected to a plurality of Network Elements (NEs) in a Wireless Communication Network, said NC adapted to create a configurable primary synchronization frame; transmit said primary synchronization frame to said plurality of NEs; receive acknowledgements from said plurality of NEs; check if a first criterion has been satisfied; and transmit secondary synchronization frames till said first criterion is satisfied, wherein said secondary synchronization frame is of a reduced length as compared to length of said primary synchronization frame and has an increased frequency of transmission as compared to frequency of transmission of said primary synchronization frame.

12. The NC as claimed in claim 11, wherein said NC is adapted to configure said synchronization frames based on factors comprising of
maximum allowable clock drift rate value of said NEs; and
data exchange value associated with a NE from said plurality of NEs, wherein said NE has the highest data exchange value.

13. The NC as claimed in claim 11, wherein said NC is adapted to configure length of said synchronization frames to match periodicity of transfer of said synchronization frames with data exchange rate of said plurality of NEs.

14. The NC as claimed in claim 11, wherein said NC is adapted to vary length of said synchronization frames by varying number of synchronization blocks present in said synchronization frames.

15. The NC as claimed in claim 11, wherein said NC is adapted to transmit said synchronization frames using physical layer.

16. A Network Element (NE) in a Wireless Communication Network, said network comprising of a plurality of said NEs and a Network Controller (NC), said NE adapted to receive a primary synchronization frame from said NC; perform synchronization with said NC using said primary synchronization frame; and transmit an acknowledgement to said NC, on said NE completing synchronization with said NC, wherein said acknowledgement comprises of identity of said NE and clock drift value of said NE, wherein said NC checks if a first criterion has been satisfied and said NC transmits secondary synchronization frames till said first criterion is satisfied, wherein said secondary synchronization frame is of a reduced length as compared to length of said primary synchronization frame and has an increased frequency of transmission as compared to frequency of transmission of said primary synchronization frame.

17. The NE as disclosed in claim 16, wherein said NE is adapted to perform synchronization using at least one synchronization block of said synchronization frame.

* * * * *